(12) United States Patent  (10) Patent No.: US 7,431,043 B2
Xiang et al.  (45) Date of Patent: Oct. 7, 2008

(54) AUTOMATIC TRANSMISSION HAVING A PRESSURE REGULATOR WITH FLOW FORCE COMPENSATION

(75) Inventors: Xiaoning Xiang, Troy, MI (US); Melissa Koenig, Howell, MI (US); William Vukovich, White Lake Twp., MI (US)

(73) Assignee: Borgwarner Inc., Auburn Hills, MI (US)

( * ) Notice: Subject to any disclaimer, the term of this patent is extended or adjusted under 35 U.S.C. 154(b) by 463 days.

(21) Appl. No.: 11/082,309

(22) Filed: Mar. 17, 2005

(65) Prior Publication Data

US 2006/0207655 A1 Sep. 21, 2006

(51) Int. Cl.
G05D 7/01 (2006.01)
(52) U.S. Cl. .............................. 137/118.02; 137/625.69; 137/597; 251/282
(58) Field of Classification Search ............ 137/118.01, 137/118.02, 597, 625.25, 625.65, 625.66, 137/625.69; 251/282, 333
See application file for complete search history.

(56) References Cited

U.S. PATENT DOCUMENTS

| | | | | | |
|---|---|---|---|---|---|
| 2,702,049 | A | * | 2/1955 | Seeloff | 137/625.69 |
| 3,053,051 | A | * | 9/1962 | Kelley | 60/329 |
| 4,023,444 | A | * | 5/1977 | Murakami | 477/151 |
| 4,155,535 | A | * | 5/1979 | Seamone | 251/282 |
| 4,220,178 | A | * | 9/1980 | Jackson | 137/625.3 |
| 4,662,249 | A | * | 5/1987 | Miki et al. | 477/132 |
| 4,941,508 | A | * | 7/1990 | Hennessy et al. | 137/625.69 |
| 5,732,736 | A | | 3/1998 | Ollivier | |
| 5,944,042 | A | * | 8/1999 | Takahashi et al. | 137/1 |
| 6,378,302 | B1 | | 4/2002 | Nozawa et al. | |
| 6,435,213 | B2 | | 8/2002 | Lou | |
| 6,438,952 | B1 | | 8/2002 | Nozawa et al. | |
| 6,957,665 | B2 | * | 10/2005 | Shin et al. | 137/625.69 |
| 2002/0082131 | A1 | * | 6/2002 | Park et al. | 475/127 |
| 2004/0138025 | A1 | * | 7/2004 | Yamaguchi et al. | 477/156 |

FOREIGN PATENT DOCUMENTS

DE  21 11 861 A1 *  9/1978

* cited by examiner

Primary Examiner—Kevin L Lee
(74) Attorney, Agent, or Firm—Bliss McGlynn, P.C.

(57) ABSTRACT

An automatic transmission having a pressure regulator with flow force compensation. The pressure regulator includes a valve body having a valve bore and at least one inlet and at least one outlet adapted to provide fluid communication with a source of pressurized hydraulic fluid and a return to the source of pressure. A valve member is slidingly disposed within the valve body that includes at least one valve element having an outer diameter and a metering face. The metering face is adapted to control the flow of pressurized hydraulic fluid between the inlet and the outlet of the valve body. The metering face includes a flow force compensating annular void disposed adjacent to the outer diameter that is defined by a lead angle $\alpha$ measured between the outer surface and a line intersecting the outer surface and tangential to the annular void.

5 Claims, 3 Drawing Sheets

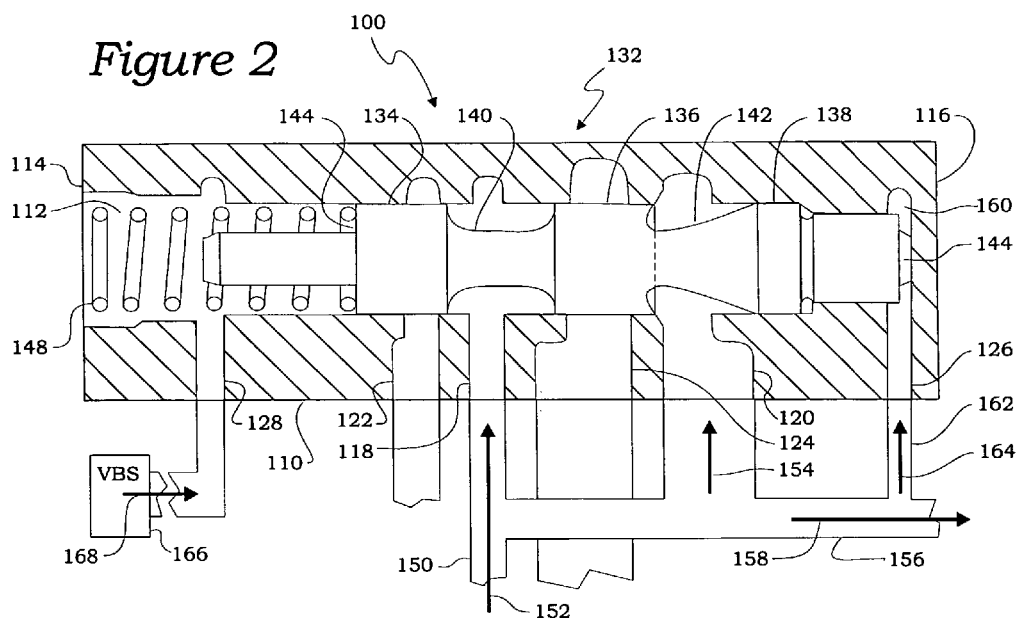
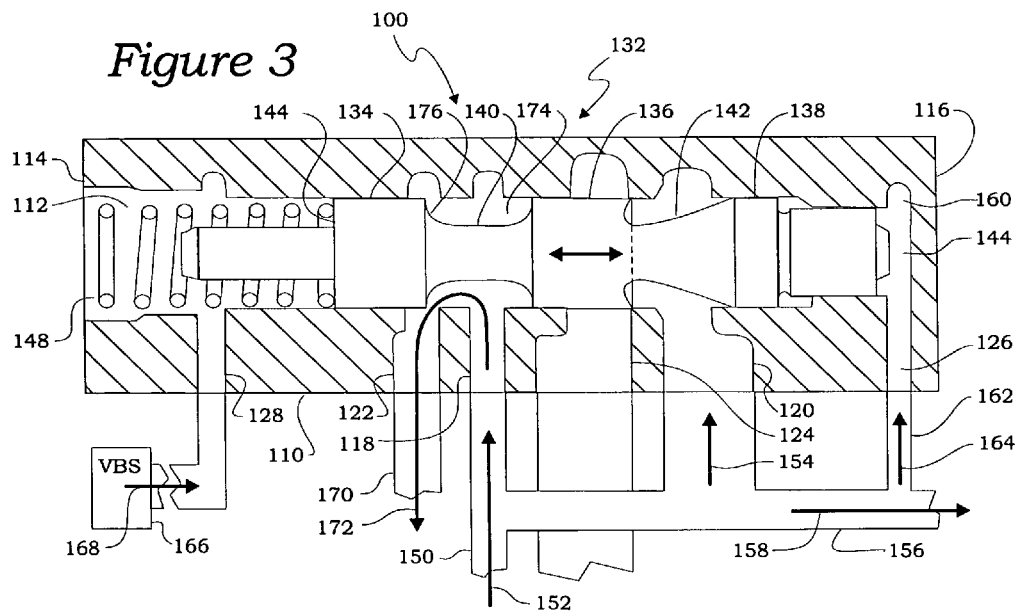

AUTOMATIC TRANSMISSION HAVING A PRESSURE REGULATOR WITH FLOW FORCE COMPENSATION

BACKGROUND OF THE INVENTION

1. Field of the Invention

The present invention relates, generally to an automatic transmission having a pressure regulator and, more specifically, to an automatic transmission having a pressure regulator with flow force compensation.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated, or automatic, manual transmissions (AMTs) typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. The development of AMTs has provided a viable and improved means of power transmission for motor vehicles over the conventional automatic transmissions having a torque converter. However, even with the inherent improvements of these newer automated transmissions, they still have an operative power interruption in the drive connection between the input shaft and the output shaft during sequential gear shifting. Power interrupted shifting results in a distinct shift feel that is generally associated with manual transmissions and may considered undesirable in certain operating environments.

To eliminate the power interruption in AMTs, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions (DCTs). The dual clutch structure is most often coaxially and cooperatively configured to derive power input from a single engine flywheel arrangement. However, some designs have a dual clutch assembly that is coaxial, but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform upshifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear selection and gear engagement in either an AMT or a DCT is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. The majority of the newer AMT and DCT designs employ 6 forward gears and a reverse gear, which provides greater efficiency and fuel economy by having closer ratio gear sets than previous designs.

While these new types of automatic transmissions have overcome several drawbacks associated with conventional transmissions, it has been found that controlling and regulating these automatically actuated transmissions to achieve the desired vehicle occupant comfort goals in an efficient and cost effective manner is a complicated matter. There are a large number of events to properly time and execute within the transmission for each shift to occur smoothly and efficiently.

Furthermore, since the control of these types of automatic transmissions is carried out by hydraulically actuating the various components within the transmission, it is important to provide a stable hydraulic supply pressure. Since hydraulically actuated devices respond in a predetermined and a precise manner for the given pressure supplied to actuate them, inaccurate control of the hydraulic supply pressure causes inaccurate operation and control of a AMT or DCT transmission. Up to this point, establishing and maintaining a stable hydraulic supply pressure in these newer types of automatic transmissions has proven problematic. As previously mentioned, a pump is employed to provide pressurized hydraulic fluid for the control and actuation of the transmission. In addition, the clutches and gear assemblies are lubricated and cooled by a secondary flow of hydraulic fluid. Typically, the pump is mechanically driven by a power take-off from the engine. Thus, the hydraulic pressure delivered from the pump increases as the pump speed increases in response to an increase in engine speed.

To address the changes in the hydraulic pressure delivered by the pump as engine speed changes, the hydraulic supply circuits of conventional dual clutch transmissions include a pressure regulator. More specifically, a pressure regulator is employed to establish and maintain a specific predetermined pressure in the hydraulic supply line. The pressure regulator includes a valve member slideably disposed within a valve body that moves back and forth over the various ports in the valve body to direct and control the fluid flow between the ports.

Since the pump is sized to provide the necessary pressure at idle and provides increased pressure as the engine speed increases, the pressure regulator is typically designed to dump, or bleed off the excessive flow to the return, or suction side of the pump. This action provides, at best, a rudimentary regulation of gross variations in pressure. However, the conventional regulation approaches fail to properly account for various flow effects of the hydraulic fluid within the hydraulic circuit and do not provide the precise and stable hydraulic supply pressure that is necessary to ensure accurate control over the AMT or DCT transmission. More specifically, to provide a stable regulated "line" pressure, the pressure regulator must be responsive to changes in the flow forces that occur within the regulator due to changes in the hydraulic flow in the line pressure side and the return, or suction side of the regulator.

The flow force is the relative force of the hydraulic fluid that acts upon the lands of the regulator valve member as the fluid moves through the pressure regulator. Flow forces are considered to be either steady state or transient. Steady state flow force is the force of the hydraulic fluid upon the valve member of the regulator that results from fluid accelerating property of the orifice formed within the regulator between the regulating valve member and the inlet and outlet ports. The steady state flow force is directly proportional to the pressure drop through the regulator and the area of the formed orifice. The steady state flow force always acts in a direction to close the regulator. Steady state flow forces relate to a steady state of the regulating valve member due to relatively constant flow conditions.

Transient flow force is the force in the hydraulic fluid that occurs when the valve member is moved and is due to the change of speed of the fluid moving through the valve as the size of the regulating area within the valve changes. The magnitude of transient flow force is proportional to the velocity of the movement of the valve member and pressure changes. The direction of the transient flow force depends on change to the flow. Transient flow forces relate to the regulating movements of the valve member.

The effects of these flow forces upon the pressures regulator are manifest as the fluid flow moves through the valve body of the regulator. As the hydraulic fluid moves through the regulator the inherent flow forces act against the physical surfaces of the valve member, the applied force can physically effect the position of the valve member in the valve body causing it to move and generate instability in the pressure regulator. For example, an increase in fluid flow from the pump may act upon the valve member surfaces of the pressure regulator forcing it open further, or an increase in pump suction may cause the regulator to move in an uncontrolled manner. The forced movement of the pressure regulator valve member by the flow forces causes instability in the line pressure and causes further variations in the flow as the regulator tries to correct. The effects of the flow forces upon the valve member of the pressure regulator may vary depending upon how the ports and the valve member of the pressure regulator are designed and how the pressure regulator is operatively placed in the hydraulic circuit.

Thus, while the current pressure regulators have generally worked for the intended purpose of gross regulation of line pressure to a relative range, they are still susceptible to flow forces fluctuations causing inaccurate hydraulic control of the transmission. Specifically, the structural configuration of a conventional transmission pressure regulator is one of two known types, neither of which is without certain drawbacks. These two types of pressure regulator configurations are based upon their different approaches to how the pressure is physically regulated or "metered." One approach relates to a pressure regulator valve member and port interaction that is known as a "meter-in" configuration, in which the valve member of the regulator is designed to move across and regulate (i.e. meter) the line pressure on its line (inlet) port with the return or suction port of the regulator open and unrestricted. A meter-in configuration provides good control over the steady state flow but is generally unstable in regulating transient flow force. The other pressure regulator design approach is known as a "meter-out" configuration. With a meter-out configuration, the valve member of the regulator is designed to move across and regulate (i.e. meter) the line pressure on the suction (outlet) port with the line inlet port of the regulator open and unrestricted. A meter-out configuration provides good control during transient flow force conditions, but offers less stable control of the steady state flow force. The lack of valve stability in either of these pressure regulator configurations introduces line pressure fluctuations and subsequent inaccurate actuation and control of the dual clutch transmission. The inefficiencies and inaccuracies in hydraulic control of the dual clutch transmission that are attributable to the pressure regulator are distinct and produce quantifiable losses of vehicle output power and fuel economy.

In an AMT or DCT transmission, the pressure regulator is most often subject to steady state flow forces, while transient flow forces occur only during certain operational periods. Therefore, even with the above-mentioned instabilities, the meter-in configuration is the most common design type employed in conventional dual clutch transmissions. Attempts have been made to compensate for the transient flow force effects in meter-in configuration regulators. However, these attempts have been largely unsuccessful and have only made compensations for transient flow force effects at the expense of introducing instabilities in steady state flow force control. Thus, the conventional approaches employed with hydraulic pressure regulators in an AMT or DCT transmission remain inefficient and susceptible to fluctuations and inaccurate control of the line pressure causing inaccurate hydraulic control of the dual clutch transmission. Accordingly, there remains a need in the related art for an automatic transmission having a pressure regulator with flow force compensation that provides stable line pressure for both steady state flow and transient flow conditions.

SUMMARY OF THE INVENTION

The disadvantages of the related art are overcome by the present invention of an automatic transmission having a pressure regulator with flow force compensation. More specifically, the pressure regulator includes a valve body having a valve bore and at least one inlet and at least one outlet adapted to provide fluid communication with a source of pressurized hydraulic fluid and a return to the source of pressure. A valve member is slidingly disposed within the valve body that includes at least one valve element having an outer diameter and a metering face. The metering face is adapted to control the flow of pressurized hydraulic fluid between the inlet and the outlet of the valve body. The metering face includes a flow force compensating annular void disposed adjacent to the outer diameter that is defined by a lead angle $\alpha$ measured between the outer surface and a line intersecting the outer surface and tangential to the annular void.

In this manner, the automatic transmission of the present invention having a pressure regulator with flow force compensation provides the advantages of highly stable and accurate control of the line pressure regardless of steady state flow and transient flow conditions. The present invention includes a shaped valve member and ports that direct the hydraulic flow through the pressure regulator in such a manner as to reduce the effects of the flow forces inherent in the flow of the regulated hydraulic fluid moving through the regulator. This provides extremely accurate and stable line hydraulic pressure resulting in accurate and efficient control of the transmission, which translates into improved the efficiency of the transmission and the vehicle.

Other objects, features and advantages of the present invention will be readily appreciated, as the same becomes better understood after reading the subsequent description taken in connection with the accompanying drawings.

BRIEF DESCRIPTION OF THE DRAWINGS

FIG. 2 is a cross-section of the pressure regulator of the present invention illustrating the regulator in a non-regulating position;

FIG. 3 is a cross-section of the pressure regulator of the present invention illustrating the regulator in a first regulating range;

DETAILED DESCRIPTION OF THE PREFERRED EMBODIMENT(S)

The present invention relates, generally, to an automatic transmission for a motor vehicle that includes a pressure regulator, and more specifically to an automatic transmission having a pressure regulator with flow force compensation. Generally speaking, an automatic transmission forms a portion of a vehicle powertrain and is responsible for taking a torque input from a prime mover, such as an internal combustion engine, and transmitting the torque through selectable gear ratios to the vehicle drive wheels. With regard to the recent evolution in vehicle transmissions that have produced automatic transmissions of the types generally known as automated manual transmissions and dual clutch transmissions, the present invention overcomes the shortcomings and drawbacks related to employing a transmission pressure regulator that does not provide compensation for the flow forces that inherently act upon the valve member of the regulator.

Figure 1:
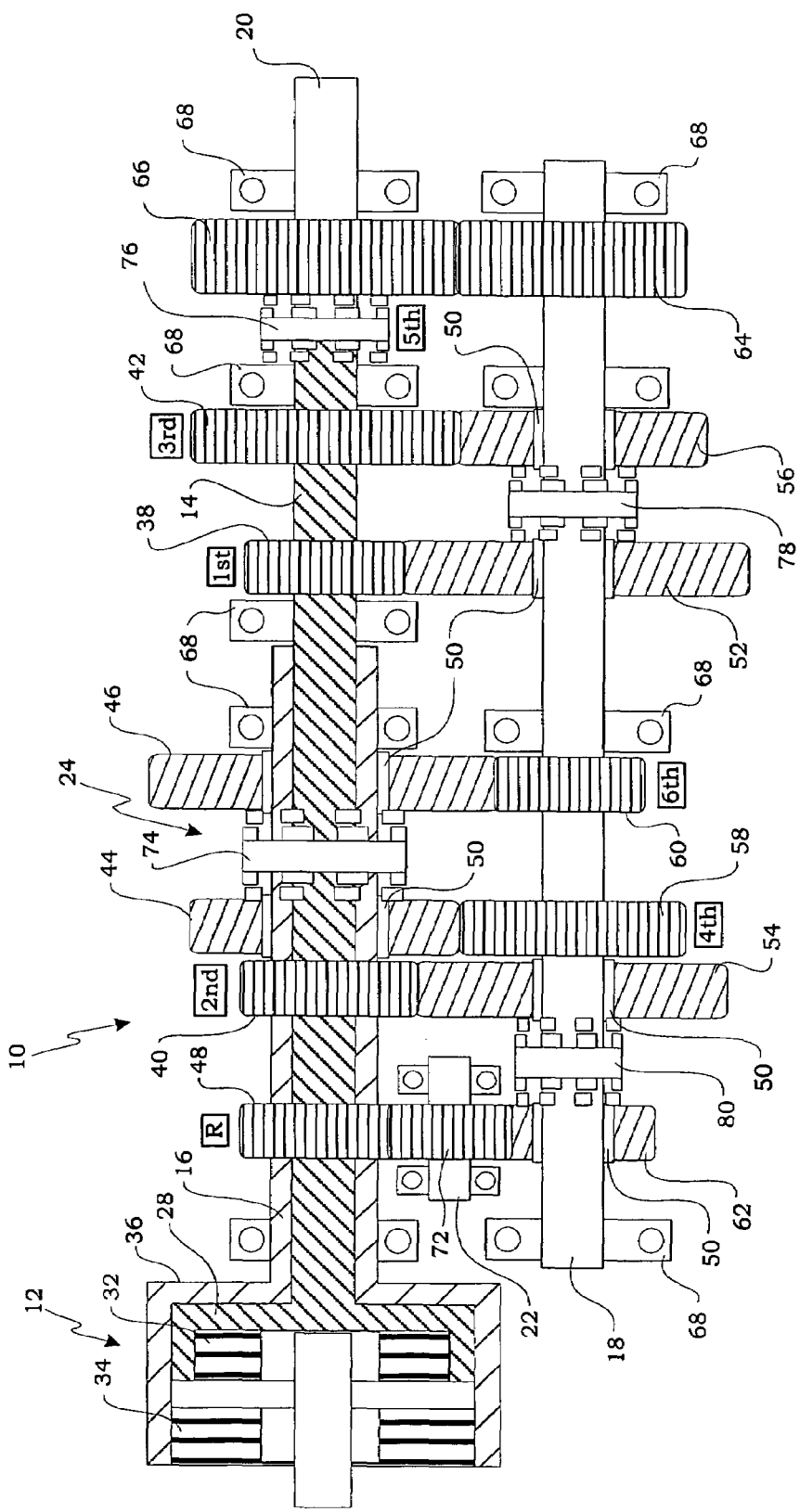
FIG. 1 is a schematic illustration of a dual clutch transmission of the type that may employ the pressure regulator of the present invention.

One example of an automatic transmission of the present invention having a pressure regulator with flow force compensation is represented as a dual clutch transmission, which is generally indicated at 10 in the schematic illustration of FIG. 1. It should be appreciated by those of ordinary skill in the art that, although not illustrated herein, the pressure regulator of the present invention may be employed with all varieties of automatic transmissions that utilize a pressure regulator to control hydraulic pressure. With regard to this example, as shown in FIG. 1, where like numbers indicate like structure throughout the illustrations, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

It should be appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10.

Thus, it can be readily seen that a number of hydraulic control assemblies or systems must be in place to control the operation of the dual clutch transmission. Furthermore, since the clutch mechanisms, gear sets, and other mechanical portions of the transmission are cooled and lubricated by the hydraulic fluid that is circulated within the transmission, there must be a control assembly or system for these purposes as well. Thus, it should be appreciated that the dual clutch transmission 10 includes an electro-hydraulic circuit and the additional requisite structure to hydraulically control the transmission. For example, the transmission 10 typically includes a pump (not shown) that draws from a fluid sump and produces a flow of pressurized hydraulic fluid. The pressurized hydraulic fluid is used as the hydraulic actuation and motive force for the transmission control assemblies and systems, and is also used as the lubrication and cooling media within the transmission. It should be further appreciated that the pump provides an output of pressurized hydraulic fluid through some type of filter and some type of cooling device such as a heat exchanger. In this manner, the pump provides filtered and cooled hydraulic fluid as "line" pressure for actuating the various devices within the transmission and provide a source of cooling media.

To properly control and stabilize the line pressure, the dual clutch transmission 10 also includes a pressure regulator. The pressure regulator of the present invention is generally indicated at 100 in FIG. 2. The pressure regulator 100 includes a valve body 110 having valve bore 112. The valve bore 112 has a biasing end 114 and an actuating end 116. The valve body also includes at least one inlet and at least one outlet adapted to provide fluid communication with the source of pressurized hydraulic fluid and a return to the source of pressure. Specifically, the valve body 110 includes a first line inlet port 118, a second line inlet port 120, a cooler/lube outlet port 122, a suction outlet port 124, an actuating port 126, and a regulating port 128. The operative connections of the ports will be discussed in detail below.

A valve member 130 is slideably disposed within the valve bore 112. The valve member 130 has a plurality of valve elements, generally indicated at 132. The valve elements 132 are adapted to control the flow of pressurized hydraulic fluid between the inlets and the outlets of the valve body 110. It should be appreciated that the pressure regulator 100 of the present invention may be configured to regulate the hydraulic line pressure for either the control and actuation devices, or the cooling and lubrication of the transmission, or both. In the preferred embodiment, the pressure regulator 100 of the present invention is configured to regulate the pressure for both the control and actuation devices, and for the cooling and lubrication of the transmission. Thus, the preferred embodiment includes three valve elements 134, 136, and 138 operatively separated by first and second areas of reduced diameter, 140 and 142, respectively The valve member 130 further includes a biasing end 144 and an actuating end 146. A biasing return spring 148 is disposed in the valve bore 112 between the biasing end 144 of the valve member 130 and the biasing end 114 of the valve bore 112.

In FIG. 2, the pressure regulator 100 is shown in the closed, non-regulating position. It should be appreciated that the pressure regulator 100 may be in this position when the engine and pump are off and not providing pressure or when the engine is at idle and the hydraulic pressure supplied from the pump is providing the desired pressure without the need to regulate and bleed off any excessive pressure. As shown, the first and second inlet ports 118 and 120 are in fluid communication with a source of pressurized hydraulic fluid from a pump through hydraulic line 150 as indicated by flow arrows 152 and 154. The hydraulic supply pressure is further communicated to the various control and actuating components as regulated line pressure through the continuation of hydraulic line 156 as indicated by flow arrow 158. Line pressure is also supplied to the actuating port 126 and an actuating chamber 160 formed in the actuating end 116 of the valve body 110 through hydraulic line 162 as indicated by flow arrow 164. Line pressure is further supplied to the regulating port 128 by way of a VBS (variable bleed solenoid) schematically illustrated at 166. The VBS 166 is a voltage or current operated solenoid that provides a small portion of the pump output pressure to the biasing end 114 of the valve bore 112 to supplement the force of the biasing spring 148. The VBS 166 is electronically controlled to supply a specific portion of pump pressure to the biasing end 114 to set a specific regulated pressure value for stable state pressure conditions. The remainder of the pump pressure not provided to the pressure regulator 100 by VBS 166 is bleed off to the hydraulic circuit return sump. The variable control feature of the VBS 166 allows the line pressure to be generally controlled to a predetermined pressure output or setpoint that may be adjusted for any given operational conditions.

As further illustrated in FIG. 3, the valve member 130 of pressure regulator 100 is shown in a first regulating range. It should be appreciated that the valve member 130 operates in this range when the hydraulic pressure supplied from the pump increases to the point of being excessive for the accurate control of the various control and actuating components. It should be further appreciated that the design of the overall hydraulic circuit may be such that this occurs at idle or just immediately above idle. However, in keeping with the design goal of increased transmission control efficiency, in the preferred embodiment, the pump is sized to provide the proper amount of hydraulic pressure at idle and the transmission is configured so that the lubrication and cooling requirements are met are idle and a bleed off of pump pressure is not initially necessary.

As the pump speed and pressure output increases off-idle, the biasing return spring 148 is sized to allow the valve member 130 to move into the first regulating range in response to the pump pressure applied to the actuating chamber 160. Additionally, the VBS 166 provides a predetermined amount of pump pressure to the regulating port 128 to supplement the biasing return spring 148 as required to control the movement the valve member 130 to provide the desired output pressure from the regulator 100. More specifically, in this first regulating range, the excessive pump pressure is bled off to the cooling and lubricating circuits though the cooler/lube outlet port 122 and hydraulic line 170 as indicated by flow arrow 172. As the valve member 130 is moved to the left (as illustrated in the Figures) by the pressure acting on the actuating chamber 160, the first regulating range begins when the first reduced diameter area 140 reaches the cooler/lube outlet port 122 in the valve body 110 and a flow path 174 is opened. The first regulating range of the valve member 130 continues until the point as illustrated in FIG. 3 in which the second reduced diameter area 142 is just about to reach the suction outlet port 124 in the valve body 110. As previously discussed, the VBS 166 may provide a portion of line pressure into the biasing end 114 to control the flow through flow path 174 to ensure that the output line pressure in hydraulic line 156 is regulated as desired. It should be appreciated that that the valve member 130 is operative in the first regulating range in response to engine speed staying in the off-idle to low speed range.

It should be further appreciated that flow path 174 is a meter-out flow path whereas the inlet port 118 is open and the first valve element 134 meters (regulates) the flow across the cooler/lube outlet port 122. As previously noted, the meter-out configuration is better adapted to provide good valve stability during changes in transient flow forces. Since the operating envelope for the first regulating range is in the off-idle and low speed range, where transient flow force conditions are most prevalent, the preferred embodiment utilizes the meter-out configuration for the first regulating range of the pressure regulator 100. Although the flow forces have minimal effect in the off-idle and low speed ranges, to provide better stability for steady state flow forces, the first area of reduced diameter 140 includes a radiused metering face 176 that smoothes the flow path 174 rather than having a sharp 90 degree transition vale element 136. Thus, with the relatively low pump output in the off-idle and low speed ranges a meter-out configuration of the cooling/lube flow path 174 of the present invention provides compensation for the flow forces in the pump supply pressure so that the valve member 130 is unaffected and the pressure regulator 100 can provide stable and accurate line pressure regulation to the control and actuating components while in the first regulating range.

Figure 4:
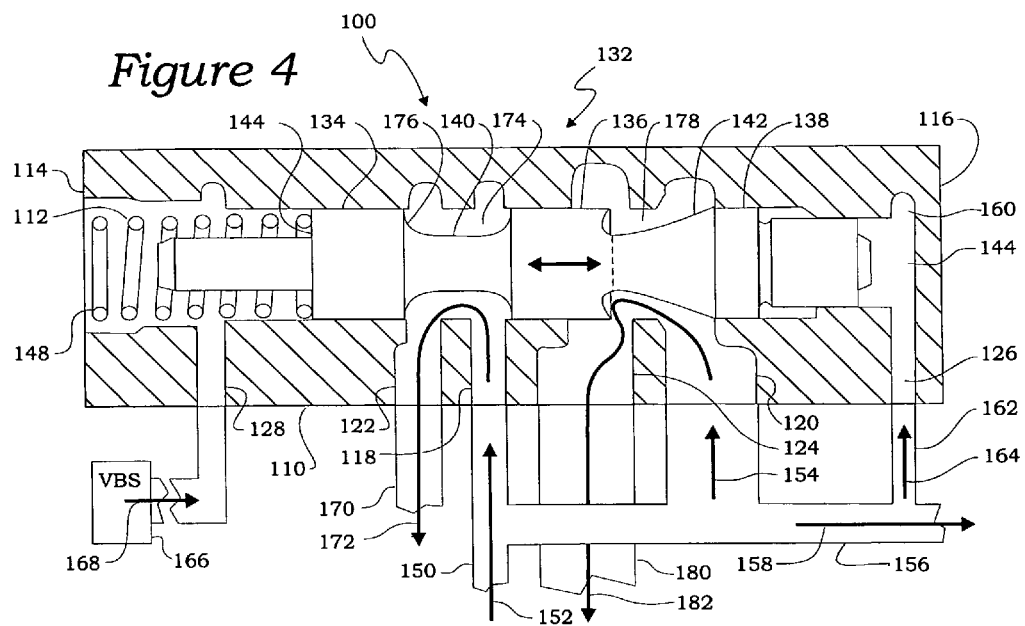
FIG. 4 is a cross-section of the pressure regulator of the present invention illustrating regulator in a second regulating range.

When the engine speed, and thereby pump output, further increase into the mid and higher operating ranges, the increased pump pressure will cause the valve member 130 to move into a second regulating range as illustrated in FIG. 4. As this point, a second flow path 178 having a meter-out configuration is opened as the valve member 130 moves further left (as illustrated in the figures) and the second valve element 136 allows the second inlet port 120 to be in fluid communication with the suction outlet port 124 and hydraulic line 180 as indicated by flow arrow 182. Due to the increased pressure and the opening of the second flow path 178, the flow of hydraulic fluid through the pressure regulator 100 also increases such that steady state flow forces are now strong enough to influence and have a negative affect upon the operation of the pressure regulator 100. As previously mentioned, since meter-in configurations have the inherent ability to control steady state flow forces better than transient flow forces, and steady state flow forces are the prevalent flow force effect in dual clutch transmission applications, the common design choice in conventional applications is to employ a meter-in regulator configuration. However, this design choice still causes the conventional regulator and transmission arrangements to suffer the less prevalent but still distinct transient flow force effects.

In contrast, the pressure regulator 100 of the present invention includes flow force compensation with a meter-out configuration. The dual clutch transmission of the present invention includes a pressure regulator 100 having a meter-out configuration that provides stability in response to transient flow forces and further includes flow force compensation that provides stable and accurate pressure regulation by overcoming the effects of the steady state flow forces, as well.

Figure 5:
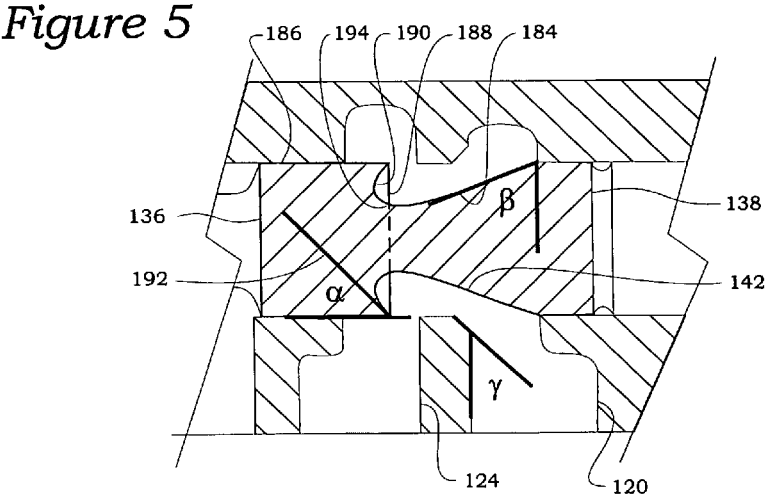
FIG. 5 is a cross-section detail of the pressure regulator of the present invention illustrating the valve member having a flow force compensating shape.

As best shown in detail in FIG. 5, to achieve flow force compensation, the valve member 130 of the present invention further includes a flow force compensating shape 184. More specifically, valve element 136 has an outer diameter 186 and a metering face 188. The metering face 188 is adapted to control the flow of the pressurized hydraulic fluid between the line inlet port 120 and the suction outlet port 124. The metering face 188 includes a flow force compensating annular void 190 disposed adjacent the outer diameter 186 of the valve element 136 and defined by a lead angle "α" measured between the outer diameter 186 and a line 192 intersecting the outer diameter 186 and tangential to the annular void 190. Additionally, the flow force compensating shape 184 includes a frusto-conically shaped area defined by the reduced diameter 142 as it extends from the valve element 138 toward the metering face 188 of valve element 136. At valve element 136, the frusto-conical shaped area of reduced diameter 142 is blended into the inner diameter 194 of the annular void 190. The flow force compensating shape 184 of the valve element 136 and the frusto-conically shaped reduced diameter area 142 is adapted to provide flow compensation for the flow forces of the pressurized hydraulic fluid as the pressurized hydraulic fluid passes though the valve body 110 allowing the pressure regulator to provide a stable and accurate regulation of the pressurized hydraulic fluid.

The flow force compensating shape 184 is also defined by a shank angle "β". Additionally, a chamfer angle "γ" is included on the edge of the second inlet port 120 that assists in smoothing the second flow path 178. While the lead angle α provides, by far, the most attributable compensating effect on flow forces acting upon the valve member 130, the shank angle β and chamfer angle γ each have a minimal, and empirically identifiable contribution, as well. To provide an appreciable effect, it has been found that the shank angle β may be formed in the angular range between 30 and 80 degrees and the chamfer angle γ may be formed in the angular range between 0 and 55 degrees. However, based on empirical testing, the optimum shank angle β is 74 degrees and the optimum chamfer angle γ is 45 degrees. Thus, the preferred embodiment, as illustrated in the Figures, utilizes a 74 degree shank angle β and a 45 degree chamfer angle γ.

It has also been found that providing any lead angle α less than 90 degrees provides some decrease in the flow force effects on the valve member 130. However, the flow forces acting upon the valve member 130 decay monotonically with respect to the decrease in lead angle α. Therefore, the smaller the lead angle α and the thereby the deeper the annular void 190 in the metering face 188, the greater the reduction in flow force. For example, employing the frusto-conical shaped area of reduced diameter 142 and a lead angle α of 90 degrees provides roughly a 13% reduction in flow force over a non-frusto-conical shaped area of reduced diameter. In contrast, employing a 10 degree lead angle α provides roughly 93% reduction in flow force effect. It should be appreciated that the percentage of reduction in flow force effect will vary somewhat based on the maximum pump output and the actual pump output at the time the valve member 130 is in the second regulating range. In other words, a higher pump output will cause the relative reduction percentage to be lower for a particular lead angle α and a lower pump output will cause the relative reduction percentage to by higher for the same respective lead angle α. It should be further appreciated that manufacturing limitations and costs may impact the lead angle chosen in the production of the pressure regulator 100 of the present invention. Specifically, while the flow forces may be completely compensated for, in theory, by providing a lead angle α as close to possible to 0 degrees, the monotonically decaying improvement in compensation provides diminishing improvements at the smaller lead angles and may prove more costly or impractical to manufacture. Thus, at present, the preferred embodiment includes a lead angle α of 30 degrees, which compensates for the flow forces acting upon the valve member 130 by providing approximately 78% reduction in flow force effect and is economically mass-producible. It should be appreciated that the lead angle α employed in the preferred embodiment will be continually reduced as manufacturing techniques and processes improve and make smaller lead angles more economically feasible. Thus, the pressure regulator 100 of the present invention includes flow force compensation that provides high valve stability and accurate and stable pressure regulation with regard to the flow force effects upon the vale member 130 during both steady state and transient regulating conditions The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

We claim:

1. An automatic transmission having a pressure regulator with flow force compensation, said pressure regulator comprising:

a valve body having a valve bore and a plurality of inlets in fluid communication with a source of pressurized hydraulic fluid and plurality of outlets, one of said plurality of outlets in fluid communication with a return to said source of pressurized hydraulic fluid, and another of said plurality of outlets in fluid communication with a cooling and lubrication circuit;

a valve member slidingly disposed within said valve body that includes a first valve element, a second valve element, and a first area of reduced diameter disposed therebetween, said first valve element, said second valve element, and said first area of reduced diameter adapted to selectively provide a flow path of pressurized hydraulic fluid from one of said plurality of inlets to said outlet in fluid communication with said cooling and lubrication circuit;

said valve member further including a third valve element, and a second area of reduced diameter disposed between said third valve element and said second valve element, said second valve element including an outer diameter and a metering face disposed on said second valve element juxtaposed to said second area of reduced diameter, said metering face adapted to control the flow of said pressurized hydraulic fluid selectively provided to said outlet in fluid communication with said return to said source of pressurized hydraulic fluid, said metering face including a flow force compensating annular void disposed adjacent to said outer diameter and defined by a lead angle α measured between said outer diameter and a line intersecting said outer diameter and tangential to said annular void;

said second area of reduced diameter having a frusto-conical shape that extends from said third valve element toward said second valve element, said frusto-conical shape adapted to provide compensation for the flow forces of said pressurized hydraulic fluid as said pressurized hydraulic fluid passes though said valve body allowing said pressure regulator to provide a stable and accurate regulation of said pressurized hydraulic fluid.

2. An automatic transmission as set forth in claim 1 wherein said second area of reduced diameter having said frusto-conical shape is blended into the inner diameter of said annular void at said metering face of said second valve element.

3. An automatic transmission as set forth in claim 2 wherein said one of said plurality of inlets and said outlet in fluid communication with said cooling and lubrication circuit are positionally disposed within said valve body and said valve member is operatively controlled within said valve body in relation to said one of said plurality of inlets and to said outlet in fluid communication with said cooling and lubrication circuit so as to define a meter-out regulating relationship between said one of said plurality of inlets and said outlet.

4. An automatic transmission as set forth in claim 2 wherein said one of said plurality of inlets and said outlet in fluid communication with said return to the source of pressure are positionally disposed within said valve body and said valve member is operatively controlled within said valve body in relation to said one of said plurality of inlets and to said outlet in fluid communication with said return to the source of pressure so as to define a meter-out regulating relationship between said one of said plurality of inlets and said outlet.

5. An automatic transmission as set forth in claim 4 wherein said at least one inlet further includes a chamfered edge defined by chamfered angle γ measured between said chamfered edge and a line perpendicular to said valve bore, said chamfered angle γ falling within an angular range of 0 to 45 degrees.

* * * * *